US012705173B2

(12) United States Patent
Confalonieri

(10) Patent No.: US 12,705,173 B2
(45) Date of Patent: Aug. 11, 2026

(54) SELECTABLE CACHE WRITING POLICIES FOR CACHE MANAGEMENT

(71) Applicant: Micron Technology, Inc., Boise, ID (US)

(72) Inventor: Emanuele Confalonieri, Segrate (IT)

(73) Assignee: Micron Technology, Inc., Boise, ID (US)

( * ) Notice: Subject to any disclaimer, the term of this patent is extended or adjusted under 35 U.S.C. 154(b) by 357 days.

(21) Appl. No.: 17/973,867

(22) Filed: Oct. 26, 2022

(65) Prior Publication Data

US 2023/0214323 A1 Jul. 6, 2023

Related U.S. Application Data

(60) Provisional application No. 63/295,430, filed on Dec. 30, 2021.

(51) Int. Cl.
*G06F 12/0804* (2016.01)

(52) U.S. Cl.
CPC .. *G06F 12/0804* (2013.01); *G06F 2212/1024* (2013.01)

(58) Field of Classification Search
CPC ..................... G06F 12/0804; G06F 2212/1024
See application file for complete search history.

(56) References Cited

U.S. PATENT DOCUMENTS 5,359,723 A * 10/1994 Mathews ............ G06F 12/0897 711/170
11,409,601 B1 8/2022 Brewer et al.
2012/0017034 A1* 1/2012 Maheshwari ....... G06F 12/0888 711/E12.001
2013/0151780 A1* 6/2013 Daly ..................... G06F 12/122 711/E12.024
2017/0357600 A1 12/2017 Moon
2018/0143911 A1* 5/2018 Moyer ................ G06F 12/0888
2018/0285261 A1* 10/2018 Mandal ............... G06F 12/0888
2019/0079877 A1 3/2019 Gaur et al.
2021/0133114 A1* 5/2021 Moyer .................. G06F 12/126
2022/0020414 A1* 1/2022 Yudanov ............... G06F 3/0659

* cited by examiner

*Primary Examiner* — Prasith Thammavong
(74) *Attorney, Agent, or Firm* — Brooks, Cameron & Huebsch, PLLC

(57) ABSTRACT

Systems, apparatuses, and methods related to selectable cache writing policies for cache management are described. A cache writing policy to manage a cache can be selected among cache writing policies based on a number of tracked criteria, which can provide cache management with a particular cache writing policy that will likely incur less latency than the other policies.

20 Claims, 8 Drawing Sheets

SELECTABLE CACHE WRITING POLICIES FOR CACHE MANAGEMENT

PRIORITY INFORMATION

This application claims the benefit of U.S. Provisional Application Ser. No. 63/295,430 filed on Dec. 30, 2021, the contents of which are incorporated herein by reference.

TECHNICAL FIELD

The present disclosure relates generally to semiconductor memory and methods, and more particularly, to apparatuses, systems, and methods of selectable cache writing policies for cache management.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
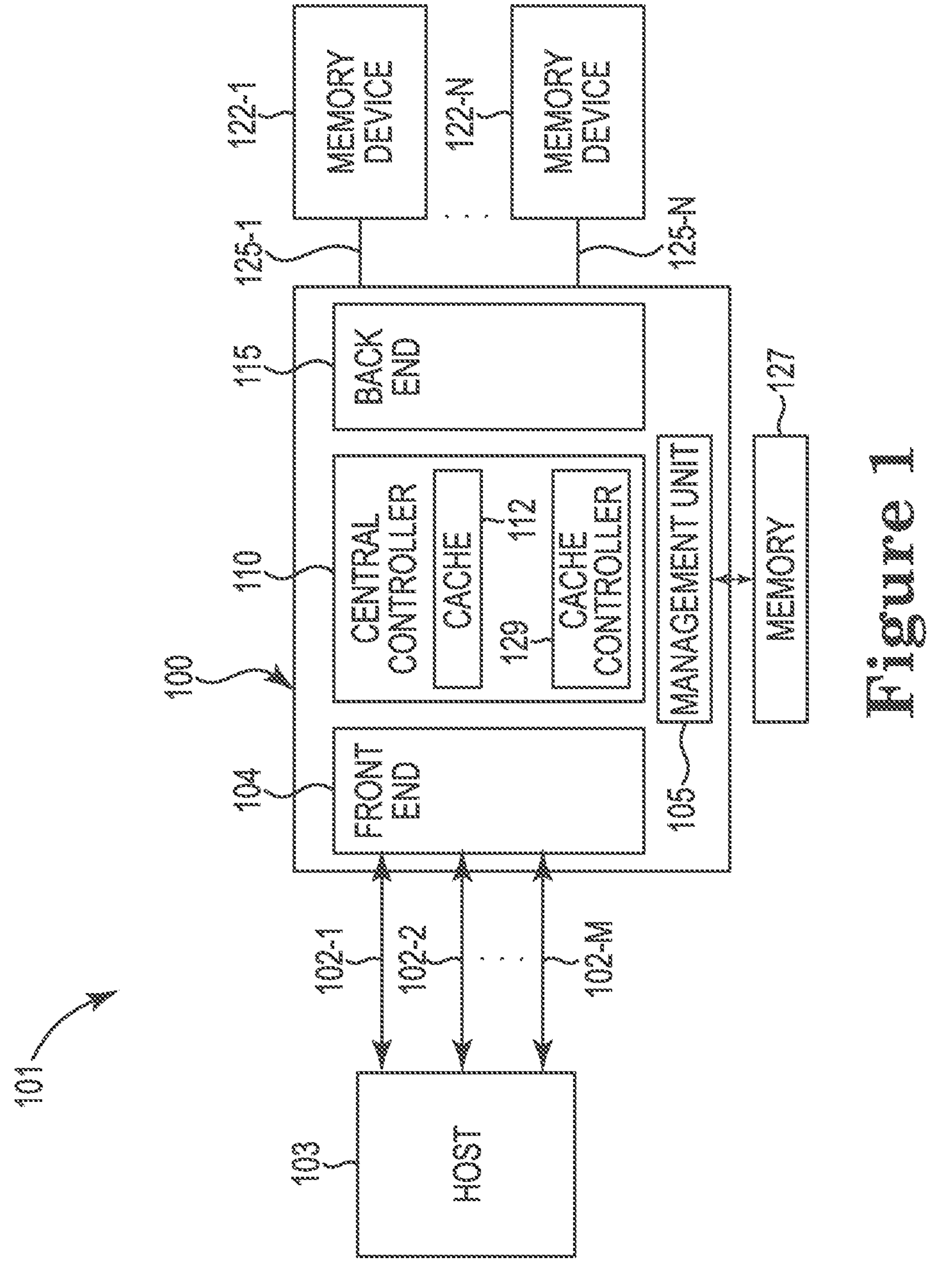
FIG. 1 illustrates a functional block diagram in the form of a computing system including a controller for managing a cache memory with selectable cache writing policies in accordance with a number of embodiments of the present disclosure.

Systems, apparatuses, and methods related to selectable cache writing policies for cache management are described. Data corresponding to memory access commands (e.g., read or write commands) received from a host system can be accessed from a cache prior to and/or without being accessed from storage system, such as memory devices. In some instances, the memory access commands may further involve accessing the memory devices in addition to the cache. The quantity of accesses to the memory devices can depend on the type of cache writing policy implemented by the cache.

The cache can be managed using different cache writing policies, such as a write-back policy and/or a write-through policy. A write-back policy involves accessing the memory device to write data stored in a "dirty" portion of the cache to the memory device. As used herein, a "dirty" portion of the cache refers to a portion of the cache storing data that has not been written to the memory device yet. In contrast, a "clean" portion of the cache refers to a portion of the cache storing data that has already been written to the memory device. A write-through policy, as compared to a write-back policy, does not involve writing the data from the cache to the memory device based on whether or not the relevant portion of the cache is dirty or clean; therefore, a write-through policy often incurs less latency than that of a write-back policy because accessing the memory device is not triggered under the write-through policy unless a cache miss occurs.

The cache can be part of for providing a "chip kill" capability, in which the memory system can work properly even if a constituent chip, such as a memory die, is damaged; thereby, avoiding a situation of one of the chips being a single point of failure (SPOF) of the memory system. Often, the chip kill capability is provided through a "Redundant Array of Independent Disks" (RAID) scheme, which allow data recovery of the damaged chip by reading all of the constituent chips of the memory system. Often, the RAID can involve a quantity of read and write accesses to the cache and/or memory devices that not only incurs the latencies when the quantity of read and write accesses are to the memory devices, but also causes synchronization issues between the cache and the memory devices when the quantity of read and write accesses are only to the cache so that data stored in the cache do not match data stored in the memory devices.

Accordingly, a write-back policy is often needed to synchronize the cache with the memory devices, although managing the cache just with a write-back policy can substantially increase the latency, which makes dynamically finding an optimal point where a write-back policy incurs less latency than that of a write-through policy, or vice versa, desirable so as to reduce the latency.

Embodiments described herein are directed to dynamic selection of a cache writing policy among selectable cache writing policies based on a number of criteria that may affect latencies associated with respective cache writing policies. The embodiments can track and update the number of criteria as memory access commands are being executed. Further, the number of criteria that are being continuously updated can be further used to dynamically select and/or determine a cache writing policy to use in association with a new memory access command. Therefore, embodiments can dynamically offer a policy that will likely incur less latency than the other policies despite the number of criteria are being changed from time to time. As used herein, the terms "determine" or "select" are used interchangeably herein and can have the same meaning, as appropriate to the context. For example, determining a cache writing policy can be alternatively referred to as selecting a cache writing policy.

In some embodiments, the memory system can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things (e.g., multiple memory banks).

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

FIG. 1 illustrates a functional block diagram in the form of a computing system 101 including a controller 100 for managing a cache memory 112 with selectable cache writing policies in accordance with a number of embodiments of the present disclosure. The computing system 101 can include a memory controller 100 comprising a front end portion 104, a central controller portion 110, and a back end portion 115. The computing system 101 can further include a host 103, memory devices 122-1, . . . , 122-N (individually or collectively referred to as memory devices 122), and a memory 127, which can be an SRAM, a flash memory, or any combination thereof, accessible via an SPI (serial peripheral interface). The memory 127 can include other circuitry, firmware, software, or the like, whether alone or in combination.

The front end portion 104 includes an interface and interface management circuitry to couple the memory controller 100 to the host 103 through input/output (I/O) lanes 102-1, 102-2, . . . , 102-M (individually or collectively referred to as I/O lanes) and circuitry to manage the I/O lanes 102. There can be any quantity of I/O lanes 102, such as eight, sixteen, or another quantity of I/O lanes 102. In some embodiments, the I/O lanes 102 can be configured as a single port. In at least one embodiment, the interface between the memory controller 100 and the host 103 can be a PCIe physical and electrical interface operated according to a CXL protocol.

The memory controller 100 can include a central controller portion 110 that can control, in response to receiving a memory access command from the host 103, performance of one or more memory operations. The memory operation can be a memory operation to read data from the cache memory 112 and/or a memory device 122 or an operation to write data to the cache memory 112 and/or a different memory device 122. In some embodiments, the central controller portion 110 can, in response to receiving a memory access command from the host 103, control writing of multiple pages of data substantially simultaneously.

As used herein, the term "substantially" intends that the characteristic needs not be absolute, but is close enough so as to achieve the advantages of the characteristic. For example, "substantially simultaneously" is not limited to operations that are performed absolutely simultaneously and can include timings that are intended to be simultaneous but due to manufacturing limitations may not be precisely simultaneously. For example, due to read/write delays that may be exhibited by various interfaces, media controllers that are utilized "substantially simultaneously" may not start or finish at exactly the same time. For example, the multiple memory controllers can be utilized such that they are writing data to the memory devices at the same time regardless if one of the media controllers commences or terminates prior to the other.

The central controller portion 110 includes a cache memory 112 (alternatively referred to as a cache). In some embodiments, in response to receiving a read command for data already stored in the cache memory 112, the data can often be provided back to the host 103 as requested without further accessing the memory device 122. In some embodiments, in response to receiving a write command, data can be stored in the cache memory 112 prior to further being written to the memory device 122.

The back end portion 115 can include media control circuitry (e.g., the media control circuitry 217 illustrated in FIG. 2, herein) and a physical (PHY) layer (e.g., the PHY layer 218 illustrated in FIG. 2, herein) that couples the memory controller 100 to the memory devices 122. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include a sixteen-pin data bus and a two pin data mask inversion (DMI) bus, among other possible buses. The back end portion 115 can exchange (e.g., transmit and/or receive) data with the memory devices 122 via the data pins and exchange error detection information and/or error correction information with the memory devices 122 via the DMI pins. The error detection information and/or error correction information can be exchanged contemporaneously with the exchange of data.

An example of the memory devices 122 is dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 122-1 is operated as an LPDDRx DRAM device with low-power features enabled and at least one of the memory devices 122-N is operated an LPDDRx DRAM device with at least one low-power feature disabled. In some embodiments, although the memory devices 122 are LPDDRx memory devices, the memory devices 122 do not include circuitry configured to provide low-power functionality for the memory devices 122 such as a dynamic voltage frequency scaling core (DVFSC), a sub-threshold current reduce circuit (SCRC), or other low-power functionality providing circuitry. Providing the LPDDRx memory devices 122 without such circuitry can advantageously reduce the cost, size, and/or complexity of the LPDDRx memory devices 122. By way of example, an LPDDRx memory device 122 with reduced low-power functionality providing circuitry can be used for applications other than mobile applications (e.g., if the memory is not intended to be used in a mobile application, some or all low-power functionality may be sacrificed for a reduction in the cost of producing the memory).

The central controller portion 110 includes a cache controller 129 that can manage the cache memory 112. The cache memory 112 can be managed using various cache writing policies, such as a write-back policy or a write-through policy, among others. In some embodiments, the cache controller 129 can dynamically select (e.g., select) one of cache writing policies, for example, each time a memory access command is received from the host 103 and to use for each access command. A cache writing policy can be dynamically selected based on a number of criteria, such as a cache hit rate, a ratio of a quantity of tracked access commands with dirty cache hits to a total quantity of tracked access commands to the cache memory 112, or a ratio of a quantity of tracked read commands to the cache memory 112 among a total quantity of tracked access commands to the cache memory 112, or any combination thereof, although embodiments are not so limited. As used here, a "dirty cache hit" refers to an instance in which a portion of a cache (e.g., the cache memory 112) associated with the executed memory access command was determined to be dirty.

The cache controller 129 can track the number of criteria as memory access commands are being received and executed. For example, as memory access commands are being executed, the cache controller 129 can track how many of those access commands involved a cache hit, a dirty cache hit, and/or were a read command over a particular quantity of memory access commands and/or over a particular period of time. As memory access commands are being executed, the cache controller 129 can dynamically update each criterion being tracked. The number of criteria can be tracked over a particular time period or a particular quantity of received/executed memory access commands.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band data and/or commands" generally refers to data and/or commands transferred through a transmission medium that is different from the main transmission medium of a network. For example, out-of-band data and/or commands can be data and/or commands transferred to a network using a different transmission medium than the transmission medium used to transfer data within the network.

As illustrated in FIG. 1, the computing system 101 further includes the memory 127 coupled to the management unit 134. The memory 127 can include a component (e.g., components 209 and/or 228) that can enable/disable a dynamic selection (e.g., determination) of a cache writing policy. For example, if the dynamic selection is disabled by the component of the memory 127, the cache controller 129 can manage the cache using just one of cache writing policies without the dynamic determination. The component 209 and/or 228 can respectively be firmware, although embodiments are not so limited.

In some embodiments, the dynamic selection can be performed at the memory 127 rather than at the cache controller 129. In this example, the selection of a particular cache writing policy made by the memory 127 for a memory access command is provided to the cache controller 129.

Figure 2:
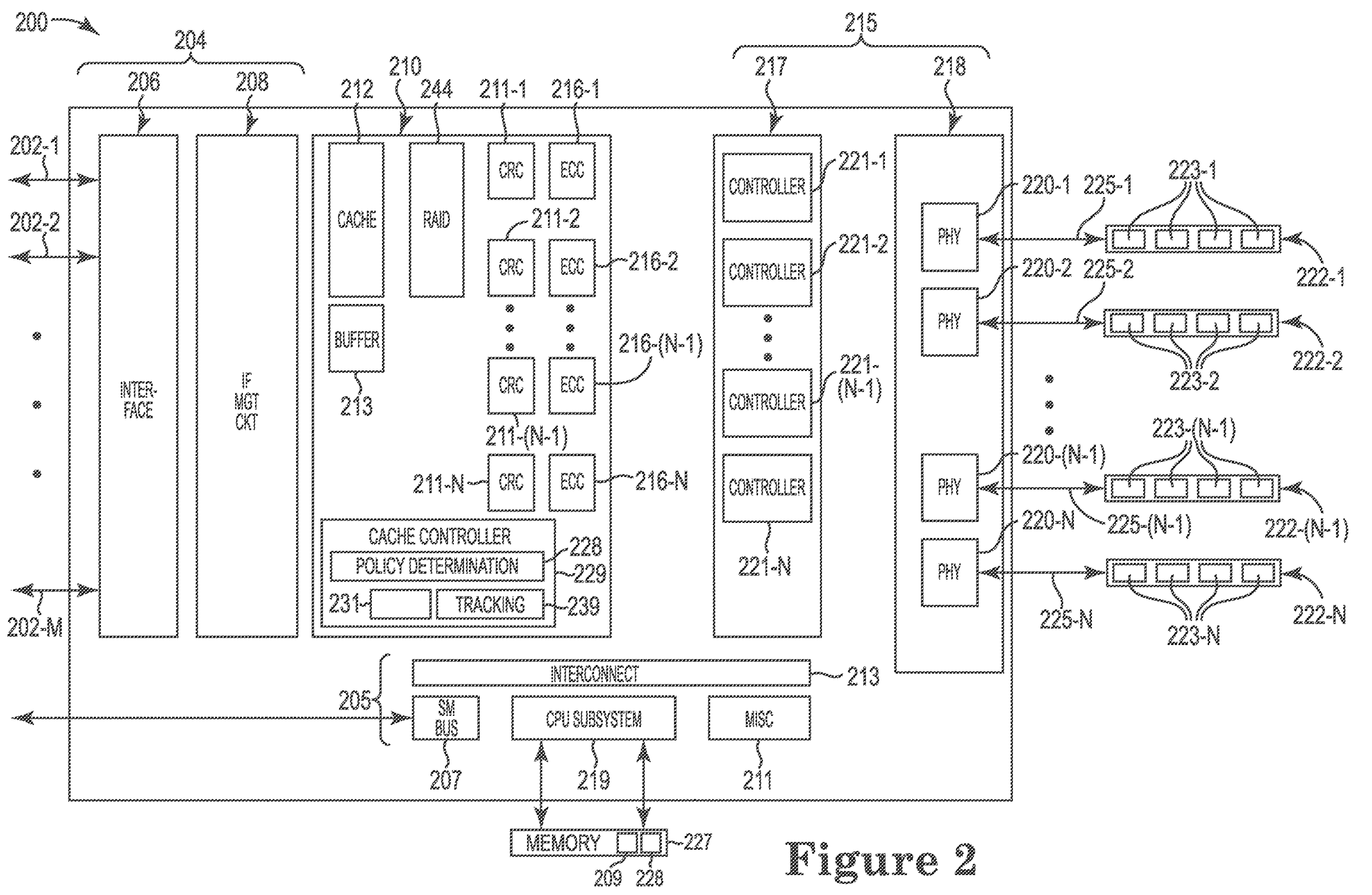
FIG. 2 illustrates a functional block diagram in the form of a memory controller for managing a cache memory with selectable cache writing policies in accordance with a number of embodiments of the present disclosure.

In a non-limiting example, an apparatus (e.g., the central controller portion 110 and 210 illustrated in FIGS. 1 and 2, respectively herein) can include a cache (e.g., the cache 112, 212, and 312 illustrated in FIGS. 1-3, respectively herein) and a controller (e.g., the cache controller 129 and 229 illustrated in FIGS. 1 and 2, respectively herein) coupled to the cache. The controller can be configured to receive a memory access command from a host (e.g., the host 103 illustrated in FIG. 1, herein). The controller can be further configured to manage, to execute the memory access command, the cache using a first cache writing policy (e.g., write-through policy) or a second cache writing policy (e.g., write-back policy) that is selected based on a number of criteria responsive to a selectable cache writing policy being enabled.

In some embodiments, the number of criteria can include a cache hit rate, a ratio of a quantity of tracked access commands with dirty cache hits to a total quantity of tracked access commands to the cache, or a ratio of a quantity of tracked read commands to the cache among a total quantity of tracked read or write commands to the cache, or any combination thereof. In some embodiments, the controller can be configured to track the number of criteria as one or more access commands are being received at the apparatus.

In some embodiments, the controller can be coupled to an external memory comprising firmware executable to select the first cache writing policy or the second cache writing policy based on the number of criteria. In this example, the firmware can be further executable to indicate the selected cache writing policy to the controller to allow the controller to execute the memory access command using the selected policy. Further, the firmware is executable to enable or disable the selectable cache writing policy. The firmware can be stored in a serial peripheral interface (SPI) flash memory.

In another non-limiting example, an apparatus (e.g., the computing system 101 illustrated in FIG. 1, herein) can include a number of memory devices (e.g., the memory devices 122 and/or 222 illustrated in FIGS. 1 and 2, respectively herein) and a controller (e.g., the central controller portion 110 and 210 illustrated in FIGS. 1 and 2, respectively herein) coupled to the number of memory devices. The controller can include a cache (e.g., the cache 112, 212, and 312 illustrated in FIGS. 1-3, respectively herein). The controller can be configured to receive a memory access command (e.g., from the host 103 illustrate din FIG. 1, herein) and perform one or more memory operations corresponding to the memory access command to access the cache or one or more of the number of memory devices, or both, according to a selected policy of a plurality of cache writing policies. The selected policy can be dynamically selected based at least in part on a cache hit rate, a ratio of a quantity of tracked access commands with dirty cache hits to a total quantity of tracked access commands to the cache, or a ratio of a quantity of tracked read commands to the cache among a total quantity of tracked read or write commands to the cache, or any combination thereof.

In some embodiments, the plurality of cache writing policies can include a write-back policy and a write-through policy. Under the write-back policy, the controller can be configured to access the one or more memory devices in response to a dirty cache hit associated with at least a portion of the one or more memory operations performed at the cache for the memory access command. Under the write-through policy, the controller is configured to access the one or more memory devices in response to a cache miss associated with at least a portion of the one or more memory operations performed at the cache for the memory access command.

In some embodiments, the cache can include a plurality of dirty bits each associated with a respective cache line of a plurality of cache lines of the cache. In some embodiments, the cache can include a plurality of cache lines each associated with a respective set of dirty bits of the cache. In this example, the controller can be configured to select the policy among the plurality of cache writing policies further based on a quantity of dirty bits of the respective set. Further, the controller can be configured to select the policy among the plurality of cache writing policies further based on an average of a quantity of dirty bits of the respective set indicating that a respective portion of the cache is dirty.

As used herein, a dirty bit is a bit that indicates whether a corresponding portion of the cache is dirty or not. For example, the dirty bit set to one binary value indicates the portion of the cache being dirty, while the dirty bit set to another binary value indicates the portion of the cache being clean (not dirty).

FIG. 2 illustrates a functional block diagram in the form of a memory controller 200 for managing a cache memory 212 with selectable cache writing policies in accordance with a number of embodiments of the present disclosure. As shown in FIG. 2, a front end portion 204 can include an interface 206 that includes multiple I/O lanes 202-1, 202-2, . . . , 202-N (individually or collectively referred to as I/O lanes 202), as well as circuitry 208 (e.g., interface management circuitry such as “IF MGT CKT” illustrated in FIG. 2) to manage the interface 206. The interface 206 can be a peripheral component interconnect express (PCIe) 5.0 interface coupled to the I/O lanes 202. In some embodiments, the memory controller 200 can receive memory access commands involving at least one of the cache memory 212, and/or the memory device 222 via the PCIe 5.0 interface 206 according to a CXL protocol. The interface 206 can receive data from a host (e.g., the host 103 shown in FIG. 1) through the of I/O lanes 202. The interface management circuitry 208 may use CXL protocols to manage the interface 206.

A central controller portion 210 can be configured to cause performance of a memory operation. The central controller portion 210 can include a cache memory 212 and a buffer 226 coupled between the interface management circuitry 208 (“IF MGT CKT” shown in FIG. 2) and circuitry (“RAID”) 214.

The buffer 226 can store data subject to an operation thereon by another component of the central controller portion 210 (e.g., error detection circuitry 211, and circuitry 214). The buffer 226 can allow for the temporary storage of information, for example, while another component of the central controller portion 210 is busy. In some embodiments, the cache memory 212 can be used to temporarily store data and the buffer 226 can be used to temporarily store other information associated with the data, such as error detection information, error correction information, and/or metadata.

The cache memory 212 can store data received from a host (e.g., the host 103 illustrated in FIG. 1, herein) and/or data to be transferred to the host. The cache memory 212 can be a thirty two (32) way set-associative cache memory (or a cache memory with any level of associativity) including multiple cache lines. The cache line size can be equal to or greater than the memory controller 200 access granularity (64 byte). For example, each cache line can include 256 bytes of data. In some embodiments, each cache line can comprise 512 bytes of data.

The cache memory 212 can further includes dirty bits each indicating whether a corresponding portion of the cache memory 212 is dirty or not. In some embodiments, a single dirty bit of the cache memory 212 can be associated with each cache line. For example, when each cache line is of 256 bytes, the cache memory 212 can include a dirty bit for each segment (e.g., portion) of 256 bytes of the cache memory 212. In some embodiments, multiple dirty bits of the cache memory 212 can be associated with each cache line. For example, when each cache line is of 256 bytes and 4 dirty bits are associated with each cache line, the cache memory 212 can include a dirty bit for each segment of 64 bytes.

The central controller portion 210 includes the circuitry 214, which can provide a Redundant Array of Independent Disks (RAID) process. The RAID process allows data recovery of the damaged chip (e.g., memory device 222) by reading all of the constituent chips that are striped with the damaged chip. For example, the RAID process, when triggered to recover user data stored on the damaged chip, can involve reading the user data from all of the chips that are grouped (e.g., striped) together along with error recovery data, such as parity data that were previously generated based on the grouped user data. For example, correcting the errors on data stored in the "bad" memory device 222 can involve reading parity data and other data stored in the "good" memory devices 222 that are grouped with the data stored in the "bad" memory device. An XOR of the other data read from the "good" memory devices 222 and the error recovery data can be used to recover the data read from the "bad" memory device 222.

Error recovery data (e.g., RAID parity) can be stored in the memory devices 222-1, . . . , 222-N in various manners. As an example, one or more memory devices of the memory devices 222 can be dedicated for the error recovery data such that the dedicated memory devices 222 are not accessed until the RAID process is triggered. For example, if there are eight memory devices 222, single one of eight memory devices 222 can be configured to store the error recovery data and the other memory devices 222 can be configured to store user data. In another example, the error recovery data can be dispersed into multiple portions that can be distributed among multiple memory devices 222. For example, error recovery data corresponding to one stripe can be stored in the memory device 222 that is different than the memory device 222 that stores error recovery data corresponding to another stripe. This can balance a quantity of accesses across the memory devices and to avoid a "hot spot" and prevent one memory device 222 from being accessed more frequently than the other memory devices 222. In another example, data can be striped across the banks 223 of an individual memory device 222 rather than across multiple memory devices 222. In this example, parity data corresponding to the data striped across the memory device can also be stored in the same memory device 222 as well.

The error detection circuitry 211 can detect an error in data (e.g., read from the memory device 222). An example of an error detection operation performed at the error detection circuitry 211 can be a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data.

The error correction code (ECC) encoding/decoding circuitry ("ECC" illustrated in FIG. 2) to ECC encode/decode the data. ECC encoding refers to encoding data by adding redundant bits to the data. ECC decoding refers to examining the ECC encoded data to check for any errors in the data. In general, the ECC can not only detect the error but also can correct a subset of the errors it is able to detect.

The RAID circuitry 214 can operate in conjunction with the error detection circuitry 211. For example, the RAID circuitry 214 can trigger the RAID process in response to indication provided by the error detection circuitry 211.

In some embodiments, the RAID circuitry 214 and/or the error detection circuitry 211 (independently or collectively) can be a finite state machine configured to manage a check and recovery algorithm during read operations from the memory devices 222. The RAID circuitry 214 can be configured to perform read-modify-write during write operations to the memory devices 222 (e.g., in order to write the data according to the desired RAID algorithm). In at least one embodiment, the error detection circuits 211-1, 211-2, . . . , 211-(N−1), 211-N can operate independently of each other during read operations in which they function to perform error detection on data specific to the memory device 222-1, 222-2, . . . , 222-(N−1), 222-N with which they are coupled via channels 225-1, 225-2, . . . , 225-(N−1), 225-N.

As shown in FIG. 2, the central controller portion 210 can include a cache controller 229. The cache controller 229 can manage the cache 212 to control performance of a memory operation (e.g., read or write operation) on the cache memory 212. As described herein, the cache controller 229 can manage the cache 212 using one of cache writing policies selected based on a number of criteria.

The cache controller 229 can further include a register 231 and a tracking component 239. The register 231 can be set to indicate which one of cache writing policies to use for managing the cache memory 212. In some embodiments, the register 231 can be a mode register. A cache write policy indicated by the register 231 can be handshake with a host (e.g., the host 103 illustrated in FIG. 1 herein) periodically and/or upon request by the host. Further, in some embodiments, the central controller portion 210 can further include a timer, which can indicate whether a certain amount of time has passed. The cache controller 229 can use the timer to automatically switch from one cache writing policy to another cache writing policy. For example, the register 231 can be set to indicate cache writing policy for the certain amount of time and the cache controller 229 can set the register 231 to indicate another cache writing policy when the timer indicates that the certain amount of time has passed.

The tracking component 239 can track a number of criteria that are used to select a cache writing policy. As described herein, the number of criteria, such as a cache hit rate, a ratio of a quantity of tracked access commands with dirty cache hits to a total quantity of tracked access commands to the cache, or a ratio of a quantity of tracked read commands to the cache memory 212 among a total quantity of tracked access commands to the cache memory 212, or any combination thereof, although embodiments are not so limited.

The cache controller 229 can further include a policy selection component 228 that can dynamically select a cache writing policy for each memory access command. The policy selection component 228 can operate in conjunction with the tracking component 239. For example, in order to select a cache writing policy for a memory access command, the policy selection component 228 can obtain a number of criteria that have been tracked by the tracking component 239 and used the number of criteria to determine the cache writing policy.

The back end portion 215 can include media control circuitry 217 and a PHY layer 218. The media control circuitry 217 can include media controllers 221-1, 221-2, . . . , 221-(N−1), 221-N. The PHY layer 218 can include PHY memory interfaces 220-1, 220-2, . . . , 220-(N−1), 220-N respectively coupled to memory devices 222-1, 222-2, . . . , 222-(N−1), 222-N via channels 225-1, 225-2, . . . , 225-(N−1), 225-N.

In some embodiments, the memory devices 222 can be of different types. The media control circuitry 220 can be configured to control at least two different types of memory. For example, the memory devices 222-1, 222-2 can be LPDDRx memory operated according to a first protocol and the memory devices 222-(N−1), 222-N can be LPDDRx memory operated according to a second protocol different from the first protocol. In such an example, the first media controller 221-1 can be configured to control a first subset of the memory devices 222-1, 222-2 according to the first protocol and the second media controller 221-2 can be configured to control a second subset of the memory devices 222-(N−1), 222-N according to the second protocol. In a specific example, the memory devices 222-1, 222-2 may have on board error correction circuitry.

A memory access command to the cache memory 212 (e.g., directed to the cache memory 212 and/or received at the cache controller 229) can further cause the memory device(s) 222 to be accessed in response to a cache miss and/or a dirty cache hit, among others. A read command to the cache memory 212 involving an access to the memory device 222 causes a single read command to be generated and forwarded to a single/target memory device 222.

A write command to the cache memory 212 involving accesses to one or more memory devices 222, causes two read and two write commands to be generated and forwarded to respective two target memory devices 222. For example, two read commands can be initially forwarded to the respective memory devices 222 to access user data stored in a target memory device 222 as well as parity data stored in a different memory device 222. Subsequently, two write commands can be forwarded to the respective memory devices 222 to write new user data (e.g., associated with the write command) to the target memory device 222 and new parity data to the different memory device 222. New parity data can be generated by comparing (e.g., XORing) the user data previously stored in the target memory device 222 to the new user data and further comparing (e.g., XORing) a result of the previous comparison to the parity previously stored in the memory device 222. This update of the parity data can be controlled/supervised by the RAID circuitry 214.

The memory device 222 can be accessed in a 64-byte granularity. In some embodiments, this can include accessing two memory dice of each memory device 222 in a 32-byte granularity. Accordingly, the 64-byte read command (to read 64 bytes of data stored in the memory device 222) can be executed by reading 64 bytes of user data (over 32 burst length) and 32 bytes of CRC data (over 16 burst lengths), causing a read amplification factor of 1.5. Further, the 64-byte write command (to write 64 bytes of data received from the host 103) can be executed by reading 64 bytes of user data and 64 bytes of parity data (each over 32 burst length), and two sets of 32 bytes of CRC data each corresponding to the user data and the parity data (each over 16 burst lengths) as well as by writing 64 bytes of new user data and 64 bytes of new parity data (each over 32 burst length), and two sets of 32 bytes of CRC data each corresponding to the new user data and the parity data (each over 16 burst lengths), causing a read amplification factor of 6.

The memory controller 200 can include a management unit 205 configured to initialize, configure, and/or monitor characteristics of the memory controller 200. In some embodiments, the management unit 205 includes a system management (SM) bus 207. The SM bus 207 can manage out-of-band data and/or commands. The SM bus 207 can be part of a serial presence detect. In some embodiments, the SM bus 207 can be a single-ended simple two-wire bus for the purpose of lightweight communication. The management unit 205 can include a CPU subsystem 219, which can function as a controller for the management unit to execute instructions associated with initializing, configuring, and/or monitoring the characteristics of the memory controller 200. The management unit 205 can include miscellaneous circuitry 211, such as local memory to store codes and/or data associated with managing and/or monitoring the characteristics of the memory controller 200. An endpoint of the management unit 205 can be exposed to the host system (e.g., the host 103 shown in FIG. 1) to manage data. In some embodiments, the characteristics monitored by the management unit 205 can include a voltage supplied to the memory controller 200 and/or a temperature measured by an external sensor. The management unit 205 can include an interconnect 213, such as an advanced high-performance bus (AHB) to couple different components of the management unit 205.

The management unit 205 can include circuitry to manage in-band data (e.g., data that is transferred through the main transmission medium within a network, such as a local area network (LAN)). In some embodiments, the CPU subsystem 219 can be a controller that meets the Joint Test Action Group (JTAG) standard and operate according to an Inter-Integrate Circuit ($I^2C$ or $I^3C$) protocol, and auxiliary I/O circuitry. JTAG generally refers to an industry standard for verifying designs and testing printed circuitry boards after manufacture. $I^2C$ generally refers to a serial protocol for a two-wire interface to connect low-speed devices like microcontrollers, I/O interfaces, and other similar peripherals in embedded systems. In some embodiments, the auxiliary I/O circuitry can couple the management unit 205 to the memory controller 200. Further, firmware for operating the management unit can be stored in the miscellaneous circuitry 211. In some embodiments, the miscellaneous circuitry 211 can be a flash memory such as flash NOR memory or other persistent flash memory device.

The CPU subsystem 219 of the management unit 205 can be further coupled to the memory 227. The memory 227 includes a policy enable component 209 and a policy selection component 228. The policy enable component 209 and/or policy selection component 228 can be circuitry, firmware, software, or the like, whether alone or in combination.

The policy enable component 209 can enable/disable dynamic selection (e.g., selection) of one policy among multiple cache writing policies. If the dynamic selection is disabled, the cache controller 229 can manage the cache 212 with the cache writing policy indicated by the register 231 without dynamically selecting one policy among multiple cache writing policies.

The policy selection component 228 of the memory 227 can have a same functionality as that of the policy selection component 228 of the cache controller 229. In some embodiments, the policy selection component 228 can be included in just one of the cache controllers 229 or the memory 227. In an example, wherein the policy selection component 228 is located just in the memory 227, the policy selection component 228 can obtain a number of criteria that have been tracked by the tracking component 239 to select a cache writing policy for a memory access command. In this example, the policy selection component 228 can provide indication of such selection to set the register 231 to indicate the selected policy (so that the cache controller 229 can manage the cache 212 using the selected policy). The policy selection component 228 of the cache controller 229 and the memory 227 can set the register 231 via command(s).

The policy selection component 228 can use the number of criteria that have been tracked by the tracking component 239 to calculate a normalized ratio based on an equation (1) shown as follows:

$$\frac{(1-HR)+4(1-HR)D}{R(1-HR)+4(1-R)} \quad \text{equation (1)}$$

where HR represents a cache hit rate, D represents a ratio of a quantity of tracked access commands with dirty cache hits to a total quantity of tracked access commands to the cache 212, and R represents a ratio of a quantity of tracked read commands to the cache memory 212 among a total quantity of tracked access commands to the cache memory 212.

The normalized ratio calculated by equation (1) can indicate which of the cache writing policies that might likely incur the lowest latency among the cache writing policies. The numerator of equation (1) indicates a normalized quantity of access commands to the cache memory 212 (e.g., directed to the cache memory 212 and/or received at the cache controller 229), RAID circuitry 214, and/or the memory devices 222 associated with managing the cache memory 212 using a write-back policy, while the denominator of equation (1) indicates a normalized quantity of access commands to the cache memory 212, RAID circuitry 214, and/or the memory devices 222 associated with managing the cache memory 212 using a write-through policy. Further details related to equation (1) are described below.

In the event of a cache hit of a write-back policy, no write or read command is further generated and forwarded to the RAID circuitry 214 because the memory access command is executed entirely at the cache memory 212 without accessing the memory devices 222, which can be expressed as follows:

$$RWR = 0$$

$$RRR = 0$$

where RWR represents a quantity of write commands to the RAID circuitry 214 and RRR represents a quantity of read commands to the RAID circuitry 214.

In the event of a cache miss of a write-back policy that did not result in a dirty cache hit (e.g., clean), an access (e.g., read or write) command to the cache memory 212 also causes another read command to be generated and forwarded to the RAID circuitry 214. Accordingly, in this case (e.g., a cache miss and without a dirty cache hit), a quantity of read commands forwarded to the RAID circuitry 214 equals to a quantity of access commands to the cache memory 212, while a quantity of write commands forwarded to the RAID circuitry 214 remains zero, which can be expressed as follows.

$$RWR = 0$$

$$RRR = CWR + CRR$$

where CWR represents a quantity of write commands to the cache memory 212 and CRR represents a quantity of read commands to the cache memory 212.

In the event of a cache miss of a write-back policy along with a dirty cache hit, an access command to the cache memory 212 causes another read and write commands to be generated and forwarded to the RAID circuitry 214. Accordingly, in this case (e.g., a cache miss along with a dirty cache hit), a quantity of read or write commands forwarded to the RAID circuitry 214 equals to a quantity of access commands to the cache memory 212, which can be expressed as follows:

$$RWR = CWR + CRR$$

$$RRR = CWR + CRR$$

As described herein, the write command to the RAID circuitry 214 further causes two read commands and two write commands to be generated and forwarded to respective two memory devices. Further, the read command to the RAID circuitry 214 further causes a single read command to be generated and executed at a respective memory device. Accordingly, a quantity of read commands to the memory devices 222 can correspond to a quantity of read commands to the RAID circuitry 214 as well as twice of a quantity of write commands to the RAID circuitry 214. Further, a quantity of write commands to the memory devices 222 equals to twice of a quantity of write commands to the RAID circuitry, which can be expressed as follows:

$$MRR = RRR + 2 * RWR$$

$$MWR = 2 * RWR$$

where MRR represents a quantity of read commands to memory devices (e.g., memory devices 222) and MWR represents a quantity of write commands to memory devices. In this example, RRR and RWR in the above examples can be further expressed in terms of CRR and CWR as follows:

$$MRR = RRR + 2 * RWR = (CWR + CRR) * (1 - HR) + 2 * (CWR + CRR) * (1 - HR) * D$$

$$MWR = 2 * RWR = 2 * (CWR + CRR) * D$$

In the above example, since RWR is triggered in response to a dirty cache hit (while RRR is not), RWR is further multiplied by D.

In the event of a cache hit of a write-through policy, a write command to the cache memory 212 causes another read command to be generated and forwarded to the RAID circuitry 214, which can be expressed as follows:

$$RWR = CWR$$

$$RRR = 0$$

In the event of a cache miss of a write-through policy, a read command to the cache memory 212 also causes another read command to be generated and forwarded to the RAID circuitry 214. Similarly, a write command to the cache memory 212 also causes another write command to be generated and forwarded to the RAID circuitry 214. Accordingly, in this case, a quantity of read or write commands forwarded to the RAID circuitry 214 respectively equals to a quantity of read or write commands to the cache, which can be expressed as follows:

$$RWR = CWR$$

$$RRR = CRR$$

In the event of a cache miss of a write-through policy and when a corresponding location of the cache is determined to be dirty, an access command causes another read and write commands to be generated and forwarded to the RAID circuitry 214. Accordingly, in this case, a quantity of read or write commands forwarded to the RAID circuitry 214 equals a quantity of access commands to the cache memory 212.

$$RWR = CWR$$

$$RRR = CRR$$

As described herein, a quantity of read commands to the memory devices 222 can correspond to a quantity of read commands to the RAID circuitry 214 as well as twice of a quantity of write commands to the RAID circuitry 214. Further, a quantity of write commands to the memory devices 222 equals twice a quantity of write commands to the RAID circuitry, which can be expressed as follows:

$$MRR = RRR + 2 * RWR$$

$$MWR = 2 * RWR$$

In this example, RRR and RWR in the above examples can be further expressed in terms of CRR and CWR as follows:

$$MRR = RRR + 2 * RWR = CRR * (1 - HR) + 2 * CWR * (1 - HR)$$

$$MWR = 2 * CWR$$

Since a write command to the RAID circuitry 214 is always triggered regardless of whether a cache hit has occurred or not, MWR is not variable based on HR.

Therefore, a ratio of a total quantity of access commands to the memory devices 222 (TMR=MWR+MRR) of a write-back policy to that of a write-through policy can be expressed as follows:

$$\frac{(CWR + CRR)(1 - HR) + 4(CWR + CRR)(1 - HR)D}{CRR(1 - HR) + 4CWR}$$

The ratio can be simplified and normalized by dividing a numerator and denominator by (CWR+CRR), which can result in a normalized equation (e.g., equation (1)).

A result of equation (1) (e.g., the normalized ratio) can indicate whether it would be beneficial to manage the cache memory 212 using a write-back policy or write-through policy. For example, the ratio being greater than 1 indicates that a write-through policy might likely incur less latency (associated with executing a memory access command) than that of a write-back policy. In contrast, the ratio being not greater than 1 indicates that a write-back policy might likely incur less latency (associated with executing a memory access command) than that of a write-through policy.

In some embodiments, a portion of the cache memory 212 corresponding to a single cache line can include multiple segments each having a respective dirty bit. In this example, accordingly, multiple dirty bits can be associated with a single cache line, which can affect a total quantity of access commands to the memory devices associated with a write-back policy differently than described above. RRR and RWR in the event of a cache hit of a write-back policy remains 0 as described herein. Similarly, RWR in the event of a cache miss also remains 0 as described herein.

In the event of a cache miss (regardless of a dirty cache hit or not) of a write-back policy, an RRR is proportional to a quantity of dirty bits associated with a single cache line, which can be expressed as follows:

$$RRR = n * (CWR + CRR)$$

where "n" represents a quantity of dirty bits associated with a single cache line.

In the event of a cache miss of a write-back policy, an RWR is further triggered from a CWR by a number of times corresponding to a quantity of dirty bits of the cache line indicating a respective segment being dirty, while triggered from a CRR by a number of times corresponding to a quantity of dirty bits associated with the cache line. This can be expressed as follows:

$$RWR = d * CWR + n * CRR$$

where "d" represents an average of a quantity of dirty bits associated with a single cache line and indicating a respective segment being dirty (therefore, "d" is equal to or less than "n").

Similar to equation (1), therefore, a normalized equation for the scenario, in which "n" dirty bits are associated with a single cache line can be obtained by substituting above-mentioned RRR and RWR to MWR and MRR, which results in a normalized equation as follows:

$$\frac{NMR(WB)}{NMR(WT)} = \frac{(1 - HR) + 4(1 - HR)D\dfrac{d \cdot CWR + n \cdot CRR}{n \cdot (CWR + CRR)}}{R(1 - HR) + 4(1 - R)} \quad \text{equation (2)}$$

Similar to the equation (1), a result of equation (2) (e.g., the normalized ratio) can indicate whether it would be beneficial to manage the cache memory 212 using a write-back policy or write-through policy. For example, the ratio being greater than 1 indicates that a write-through policy might likely incur less latencies (associated with executing a memory access command) than that of a write-back policy. In contrast, the ratio being not greater than 1 indicates that a write-back policy might likely incur less latencies (associated with executing a memory access command) than that of a write-through policy.

Figure 3:
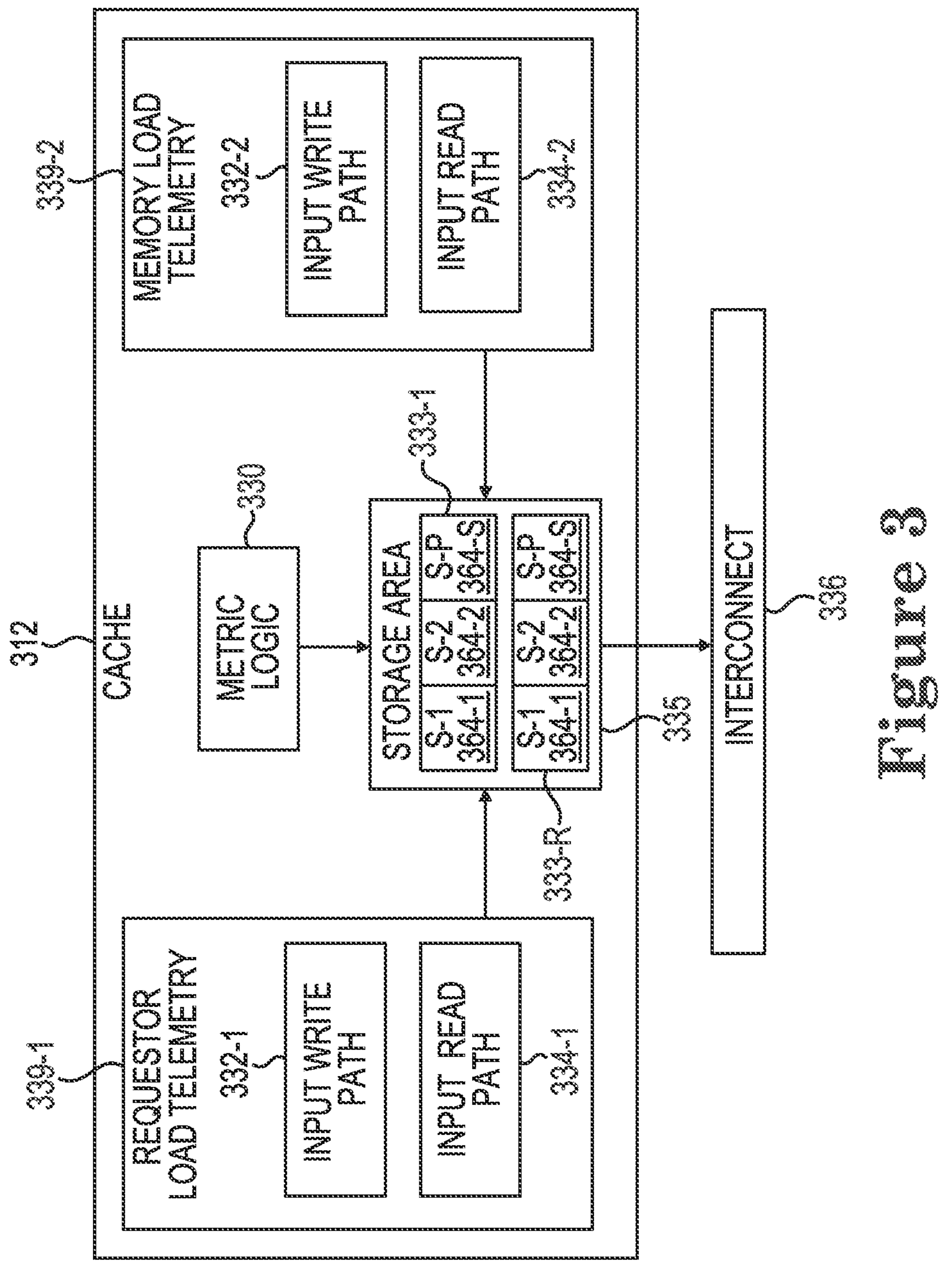
FIG. 3 illustrates a functional block diagram in the form of a cache for managing metrics and telemetry in accordance with a number of embodiments of the present disclosure.

FIG. 3 illustrates a functional block diagram in the form of a cache controller 329 for managing metrics and telemetry in accordance with a number of embodiments of the present disclosure. A cache controller 329 can be included in a central controller portion (e.g., central controller portion 110 of FIG. 1). In some embodiments, the cache controller 329 can also provide the central controller portion with information related to performance of memory operations. In some embodiments, data from a host (e.g., host 103 of FIG. 1) can be stored in the cache memory included in cache controller 329 in response to receiving a signaling indicative of memory access commands from the host.

In some embodiments, the cache controller 329 can include a metric logic 330 to collect metrics (also referred to as criteria) related to memory operations. For example, as data is read and/or written to the cache controller 329, the metric logic 330 can collect metrics related to cache hits, cache misses, cache evictions without writeback, cache replacements with writeback, cache read accesses, and/or cache write access. The metrics collected by the metric logic 330 can be used to track the criteria for dynamically selecting a cache writing policy.

In some embodiments, the metric logic can include multiple counters to collect metrics related to memory operations. For example, the metric logic 330 can include at least of a read hit (cache hits during executing a read command received from the host) counter, write hit (cache hits during executing a write command received from the host) counter, read miss (cache misses during executing a read command received from the host) counter, write miss (cache misses during executing a write command received from the host) counter, replacement counter, writeback counter, total read access (a total quantity of read access commands received from the host over a particular period) counter, total write access (a total quantity of write access commands received from the host over a particular period) counter, cache set read access counter, cache set write access counter, or any combination thereof to collect metrics related to memory operations. In some embodiments, the metric logic 330 can use a counter to count cache hits, cache misses, cache evictions without writeback, cache replacements with writeback, cache read accesses, and/or cache write access, for example. The metric logic 330 can store the count in the storage area 335. The storage area 335 can be any type of volatile memory and/or non-volatile memory. For instance, the storage area can be random access memory (RAM), NOR flash, among other possibilities. In some embodiments, the counter can store the count as an absolute value and/or store the count as a percentage (e.g., percentage of hit/misses over a total number of access commands).

In some embodiments, each counter can store counts in a respective row 333-1, 333-R (individually or collectively referred to as row 333) of the storage area 335. That is, each counter can store counts in different rows of the rows 333. For example, the write hit counter can store counts in a first row (e.g., 333-1) and the read miss counter can store counts in a second row (e.g., 333-R). In some embodiments, each counter can reset to an initial value after each count is stored in the storage area 335, for example, subsequent to a particular period of time. In some embodiments, a cache controller (e.g., the cache controller 229 illustrated in FIG. 2, herein) and/or a component of an external memory (e.g., the policy selection component 228 of the memory 227 illustrated in FIG. 2, herein) can access data stored in the metric storage area 335 to dynamically select a cache writing policy. In some embodiments, the component can access the data stored in the storage area 335 via the interconnect 336.

In some embodiments, the cache controller 329 can include a load telemetry logic to calculate the load paths within the cache controller 329. The cache controller 329 can further include a requestor load telemetry 339-1 to calculate load request from a host. In addition, the cache controller 329 can include a memory load telemetry 339-2 to calculate load request from a memory device.

For example, the requestor load telemetry 339-1 can receive a signaling indicative of access commands from a host. The signaling can cause a memory operation, such as writing data to the cache controller 329, to be performed. The requestor load telemetry 339-1 can use the input write path 332-1 to count the write path load request received by the requestor load telemetry 339-1. In some embodiments, the count for the input write path 332-1 can be increased when a write access is observed on the bus. Similarly, the signaling can cause a memory operation, such as reading data from the cache controller 329, to be performed. The requestor load telemetry 339-1 can use the input read path 334-1 to count the read path load request received by the requestor load telemetry 339-1. In some embodiments, the count for the input read path 334-1 can be increased when a read access is observed on the bus.

In some embodiments, the memory load telemetry 339-2 can receive a signaling indicative of access command from a memory device. the signaling can cause a memory operation, such as writing data to or reading data from the cache controller 329, to be performed. The memory load telemetry 339-2 can use the input write path 332-2 to count the write path load request and the input read path 334-2 received by the memory load telemetry 339-2. In some embodiments, the count for the input write path 332-2 and/or input read path 334-2 can be increased when a write access and/or read access is observed on the bus.

In some embodiments, the requestor load telemetry 339-1 and the memory load telemetry 339-2 can give an 8-bit value that represents the utilization of the memory load telemetry 339-2. For example, the requestor load telemetry 339-1 and the memory load telemetry 339-2 can calculate various ratios (HR, D, and/or R) by dividing respective count by the telemetry max value. As used herein, the "telemetry max value" is the maximum number of accesses observed on the bus. In some embodiments, the telemetry max value can be a preset value. In another embodiment, the telemetry max value can be determined based on the numbers of accesses over a particular period of time.

Figure 4:
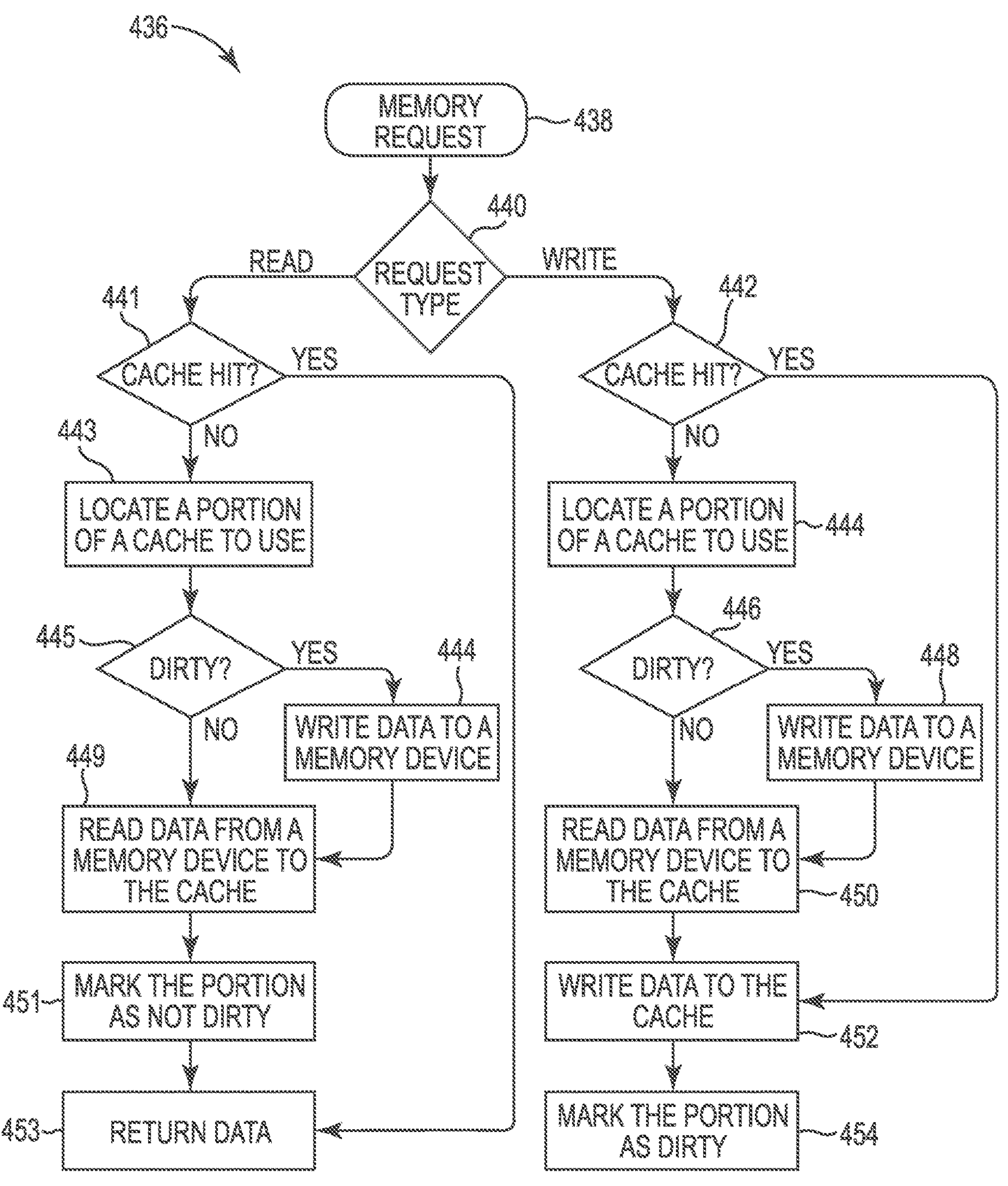
FIG. 4 is a flow diagram of managing a cache according to a write-back policy in accordance with a number of embodiments of the present disclosure.

FIG. 4 is a flow diagram 436 of managing a cache (e.g., the cache 112 and 212 illustrated in FIGS. 1 and 2, respectively herein) according to a write-back policy in accordance with a number of embodiments of the present disclosure. At 438, a memory access command is received. At 440, a type of the access command is determined. For example, it is determined whether the access command is a read or write command.

If it is determined that the access command is a read command, the flow diagram 436 proceeds to 441. At 441, it is determined whether a cache hit has occurred for data associated with the read command. For example, if it is determined that data associated with the command is stored in the cache already, then the flow diagram 436 proceeds to 453 from 441 to provide data associated with the read command from the cache to a host (e.g., the host 103 described in association with FIG. 1). If it is determined that the data associated with the command is not stored in a cache yet, then the flow diagram 436 proceeds to 443. At 443, a particular portion (e.g., block) of the cache to use for the read command is determined/located.

At 445, it is determined whether the portion of the cache is dirty or not. If it is determined that the portion is dirty, the flow diagram 436 proceeds to 447 first to write data stored in the portion of the cache to the memory device (e.g., the memory device 122 and 222 illustrated in FIGS. 1 and 2, respectively herein) and proceeds subsequently to 449 to transfer data associated with the read command from one or more memory devices to the cache. If it is determined that the portion is not dirty, the flow diagram 436 proceeds directly to 449 (e.g., to transfer data associated with the read command from one or more memory devices to the cache). At 451, the portion of the cache can be marked as being not dirty. At 453, the data associated with the read command can be provided to the host.

If it is determined that the access command is a write command at 440, the flow diagram 436 proceeds to 442. At 442, it is determined whether a cache hit has occurred for the write command. For example, if it is determined that one portion of the cache corresponds to an address of the memory device to which data associated with the write command is to be written, then the flow diagram 436 proceeds directly to 452 to write the data to the portion of the cache.

If it is determined that none of portions of the cache corresponds to an address of the memory device to which data associated with the write command is to be written, then the flow diagram 436 proceeds to 444. At 443, a particular portion (e.g., block) of the cache to use for the read command is determined/located. At 446, it is determined whether the portion of the cache is dirty or not.

If it is determined that the portion is dirty, the flow diagram 436 proceeds to 448 first to write data stored in the portion of the cache to the memory device (e.g., the memory devices 122 described in association with FIG. 1) and proceeds subsequently to 450 to transfer data corresponds to the address and stored in the memory device to the cache. If it is determined that the portion is not dirty, the flow diagram 436 proceeds directly to 450. At 452, the data associated with the write command is written to the portion of the cache. At 454, the portion of the cache can be marked as being dirty.

Figure 5:
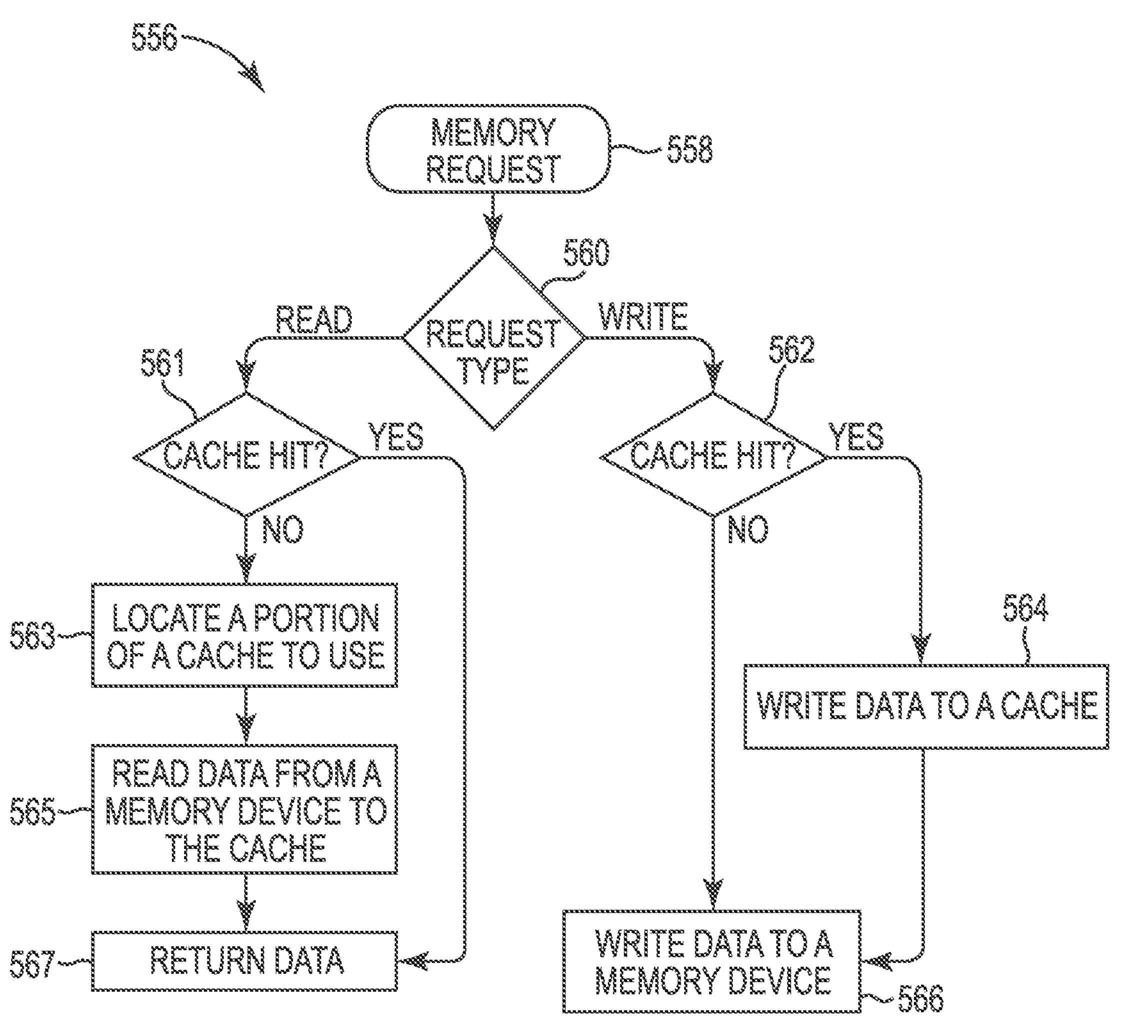
FIG. 5 is a flow diagram of managing a cache according to a write-through policy in accordance with a number of embodiments of the present disclosure.

FIG. 5 is a flow diagram 556 of managing a cache according to a write-through policy in accordance with a number of embodiments of the present disclosure. At 558, a memory access command is received. At 560, a type of the access command is determined. For example, it is determined whether the access command is a read or write command.

If it is determined that the access command is a read command, the flow diagram 556 proceeds to 561. At 561, it is determined whether a cache hit has occurred for data associated with the read command. For example, if it is determined that data associated with the command is stored in a cache (e.g., the cache 112 and 212 illustrated in FIGS. 1 and 2, respectively herein) already, then the flow diagram 556 proceeds to 567 from 561 to provide data associated with the read command from the cache to a host (e.g., the host 103 described in association with FIG. 1).

If it is determined that the data associated with the command is not stored in a cache yet, then the flow diagram 556 proceeds to 563. At 563, a particular portion (e.g., block) of the cache to use for the read command is determined/located. At 565, the data associated with the read command is transferred from the memory device (e.g., the memory device 122 and 222 illustrated in FIGS. 1 and 2, respectively herein) to the cache. Once the data has been transferred to and stored in the cache, the flow diagram 556 proceeds to 567 to provide data associated with the read command from the cache to the host.

If it is determined that the access command is a write command, the flow diagram 556 proceeds to 562. At 562, it is determined whether a cache hit has occurred for the write command. For example, if it is determined that one portion of the cache corresponds to an address of the memory device to which data associated with the write command is to be written, then the flow diagram 556 proceeds first to 564 to write data associated with the write command to the portion of the cache and proceeds subsequently to 566 to write the data stored in the cache to a portion o the memory device corresponding to the address. if it is determined that none of portions of the cache corresponds to an address of the memory device to which data associated with the write command is to be written, the flow diagram 556 proceeds directly to 566 to write the data stored in the cache to the memory device.

Figure 6:
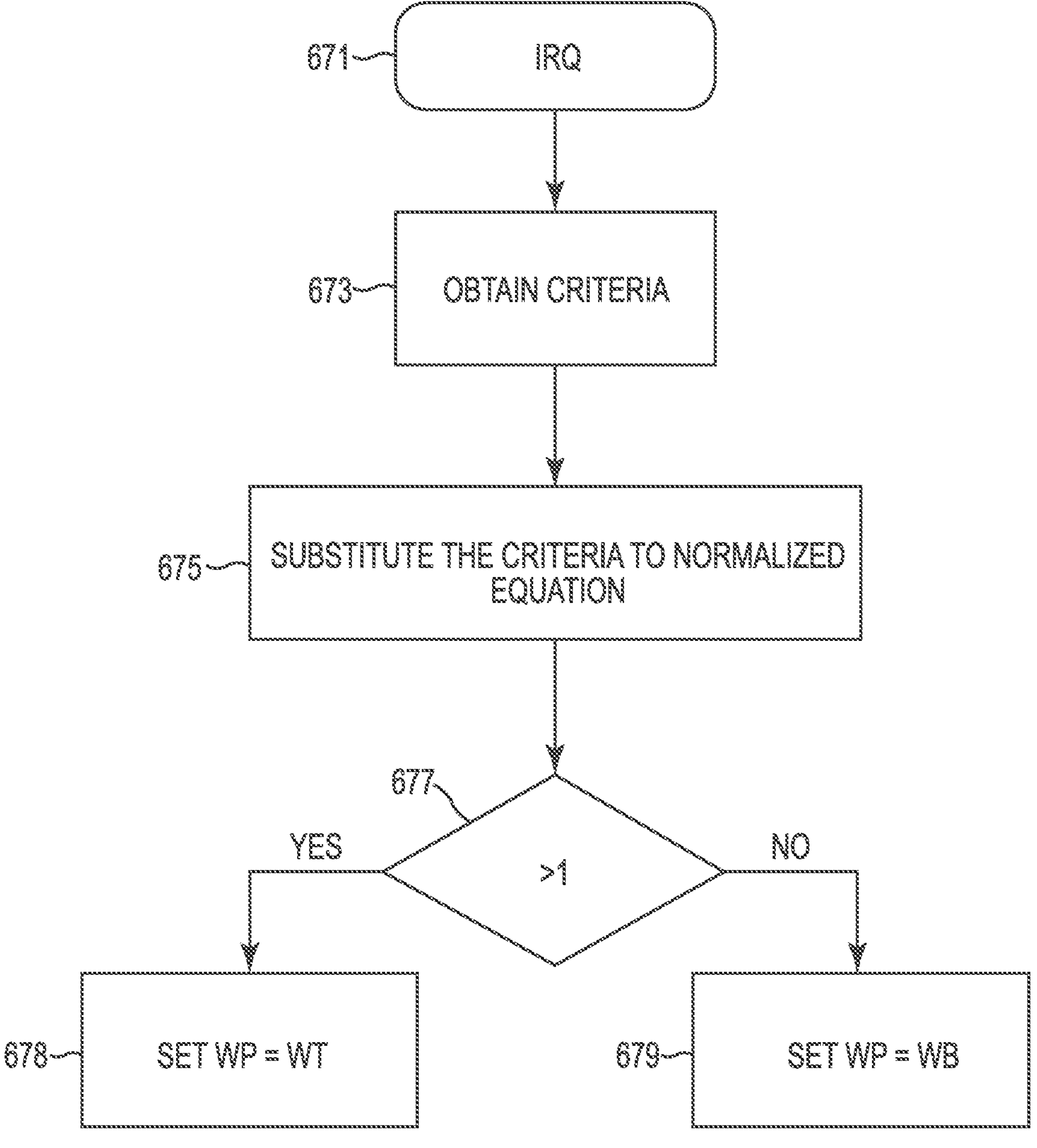
FIG. 6 is a flow diagram of selecting a cache writing policy for an access command in accordance with a number of embodiments of the present disclosure.

FIG. 6 is a flow diagram 670 of selecting a cache writing policy for an access command in accordance with a number of embodiments of the present disclosure. At 671, a memory access command is received at a cache controller (e.g., the cache controller 129 and 229 illustrated in FIGS. 1 and 2, respectively). In some embodiments, an interrupt request can be issued to the cache controller in response to receipt of the memory access command so as to select a cache writing policy prior to executing the memory access command.

At 673, a number of criteria (e.g., a cache hit rate, a ratio of a quantity of access commands with dirty cache hits to a total quantity of access commands to a cache (e.g., the cache memory 112 and 212 illustrated in FIGS. 1 and 2, respectively), or a ratio of a quantity of read commands to the cache among a total quantity of access commands to the cache that have been tracked by the cache controller over a particular time interval, a quantity of dirty bits a single cache line is associated with, and/or an average of a quantity of dirty bits associated with a single cache line and indicating a respective portion being dirty can be obtained to the cache controller and/or a component of an external memory (e.g., the policy selection component 228 of the memory 227 illustrated in FIG. 2).

At 675, the cache controller and/or the component can substitute the obtained criteria into a normalized equation, such as the equation (1) or equation (2) described herein. At 677, it is determined whether the calculated ratio is greater than 1 or not. If it is determined that the calculated ratio is greater than 1, as shown at 678, a register (e.g., the register 235 illustrated in FIG. 2, herein) can be programmed to indicate that the cache is to be managed using a write-through policy for the access command. If it is determined that the calculated ratio is not greater than 1, as shown at 679, the register can be programmed to indicate that the cache is to be managed using a write-back policy for the access command.

Figure 7:
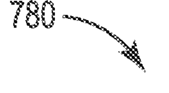
FIG. 7 is a flow diagram representing an example method for selectable cache writing policies for cache management in accordance with a number of embodiments of the present disclosure.
Figure 7:
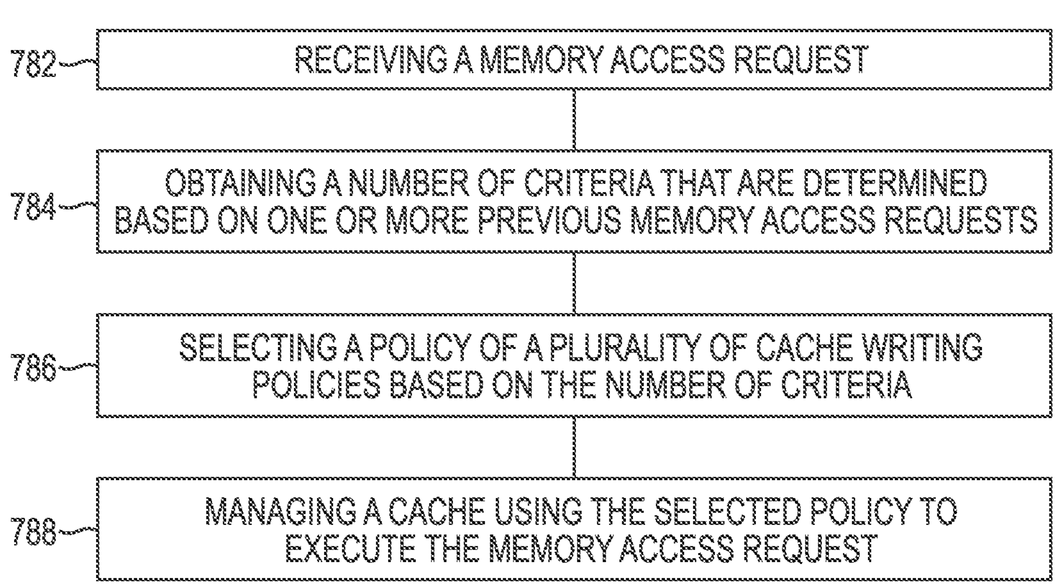

FIG. 7 is a flow diagram representing an example method 780 for selectable cache writing policies for cache management in accordance with a number of embodiments of the present disclosure. The method 780 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 780 is performed by the central controller portion 110 and 210 (e.g., the cache controller 129 ad 229, particularly) illustrated in FIGS. 1 and 2, respectively herein and/or the memory 127 and 227 illustrated in FIGS. 1 and 2, respectively herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 782, a memory access command is received. At block 784, a number of criteria that are determined based on one or more previous memory access commands can be obtained in response to receiving the memory access command. The number of obtained criteria can include a cache hit rate, a ratio of a quantity of tracked access commands with dirty cache hits to a total quantity of tracked access commands to the cache, and a ratio of a quantity of tracked read commands to the cache among a total quantity of tracked read or write commands to the cache.

In some embodiments, the cache can include a plurality of cache lines each associated with a respective set of dirty bits. In this example, the policy can be selected further based on a quantity of dirty bits of the respective set.

At block 786, a policy of a plurality of cache writing policies can be selected based on the number of criteria. The number of criteria can be used to determine a normalized ratio of a number of access commands to one or more memory devices that would be incurred according to a first policy of the plurality of cache writing policies to a number of access commands to one or more memory devices that would be incurred according to a second policy of the plurality of cache writing policies. As described herein, one of cache writing policies indicated to involve less number of access command to the one or more memory devices than that of the other polices can be determined to manage the cache. At block 788, a cache can be managed using the selected policy to execute the memory access command.

Figure 8:
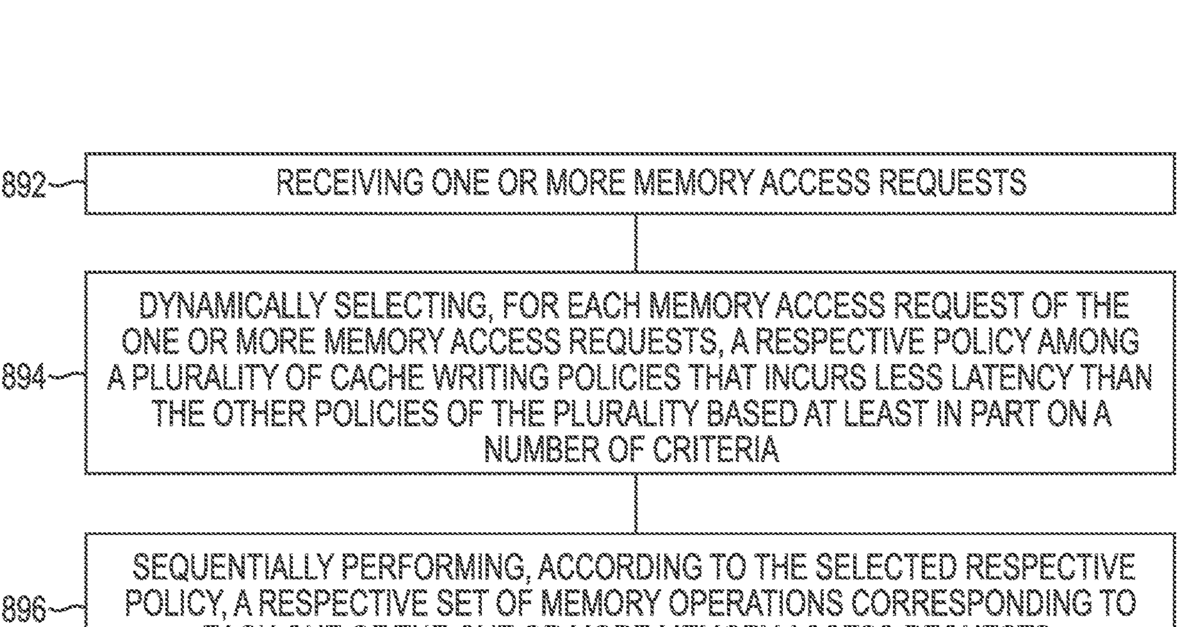
FIG. 8 is another flow diagram representing an example method for selectable cache writing policies for cache management in accordance with a number of embodiments of the present disclosure.

FIG. 8 is a flow diagram representing an example method 890 for selectable cache writing policies for cache management in accordance with a number of embodiments of the present disclosure. The method 890 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 780 is performed by the central controller portion 110 and 210 (e.g., the cache controller 129 ad 229, particularly) illustrated in FIGS. 1 and 2, respectively herein and/or the memory 127 and 227 illustrated in FIGS. 1 and 2, respectively herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 892, a number of memory access command can be received (e.g., at the cache 112 and 212 illustrated in FIGS. 1 and 2, respectively herein). At block 894, a respective policy of among a plurality of cache writing policies (e.g., a write-through policy and a write-back policy) that incurs a less latency than the other policies of the plurality can be selected for each of the number memory access commands based at least in part on a number of criteria. The number of criteria can include a cache hit rate, a ratio of a quantity of tracked access commands with dirty cache hits to a total quantity of tracked access commands to the cache, or a ratio of a quantity of tracked read commands to the cache among a total quantity of tracked read or write commands to the cache, or any combination thereof.

In some embodiments, the respective policy among the plurality of cache writing policies can be selected by comparing a number of accesses that would be incurred for one policy of the plurality to that of the other policies of the plurality as measured at the cache hit rate, the ratio of a quantity of tracked access commands with dirty cache hits to a total quantity of tracked access commands to the cache, and the ratio of a quantity of tracked read commands to the cache among a total quantity of tracked read or write commands to the cache. In some embodiments, the number of criteria can be updated (e.g., by the cache controller 129 and 229 illustrated in FIGS. 1 and 2, respectively herein) as a respective access command of the one or more access commands is executed. At block 894, a respective set of memory operations (e.g., read and/or write operations on the cache and/or memory devices 122 and 222 illustrated in FIGS. 1 and 2, respectively herein) corresponding to each one of the number of memory access commands can be sequentially performed according to the selected respective policy.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements 202-1 to 202-N may be referred to generally as 202. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. An apparatus, comprising:

a cache; and a controller coupled to the cache and configured to:

receive a memory access command from a host; and responsive to a selectable cache writing policy being enabled, manage, to execute the memory access command, at least a portion of the cache using a first cache writing policy, comprising a write-through policy, or a second cache writing policy, comprising a write-back policy, wherein the selected policy is selected based on a particular value obtained from a first ratio normalized by a function of a second ratio, wherein:

the first ratio of a quantity of tracked access commands with dirty cache hits to a total quantity of the tracked access commands to the at least the portion of the cache; and the second ratio of a quantity of tracked read commands to at least the portion of the cache among a total quantity of tracked read or write commands.

2. The apparatus of claim 1, wherein the controller is configured to track the first and second ratios as one or more access commands are being received at the apparatus.

3. The apparatus of claim 1, wherein the controller is coupled to an external memory comprising firmware executable to select the first cache writing policy or the second cache writing policy based on the particular value obtained from the first ratio normalized by a function of the second ratio.

4. The apparatus of claim 3, wherein the firmware is further executable to indicate the selected cache writing policy to the controller to allow the controller to execute the memory access command using the selected policy.

5. The apparatus of claim 3, wherein the firmware is executable to enable or disable the selectable cache writing policy.

6. The apparatus of claim 3, wherein the firmware is stored in a serial peripheral interface (SPI) flash memory.

7. A method, comprising:

receiving a memory access command;

responsive to receiving the memory access command:

obtaining a number of criteria that are determined based on one or more previous memory access commands, wherein the number of criteria comprises:

a ratio of a quantity of tracked access commands with dirty cache hits to a total quantity of the tracked access commands to at least a portion of the cache; and a ratio of a quantity of tracked read commands to at least the portion of the cache among a total quantity of the tracked read or write commands; and selecting a first cache writing policy, comprising a write-through policy, or a second cache writing policy, comprising a write-back policy, wherein the selected policy is selected based on a particular value obtained from the first ratio normalized by a function of the second ratio; and managing the at least the portion of cache using the selected policy to execute the memory access command.

8. The method of claim 7, wherein obtaining the number of criteria that are determined based on the one or more previous memory access commands comprises obtaining:

a cache hit rate;

the ratio of the quantity of the tracked access commands with dirty cache hits to the total quantity of the tracked access commands to the at least the portion of the cache; and the ratio of the quantity of the tracked read commands to the at least the portion of cache among the total quantity of the tracked read or write commands to the cache.

9. The method of claim 8, wherein the cache comprises a plurality of cache lines each associated with a respective set of dirty bits and the method further comprises selecting the policy further based on a quantity of dirty bits of the respective set.

10. The method of claim 7, further comprising determining, based on the determined number of criteria, a normalized ratio of a number of the access commands to one or more memory devices that would be incurred according to a first policy of a plurality of cache writing policies to a number of the access commands to one or more memory devices that would be incurred according to a second policy of the plurality of cache writing policies.

11. An apparatus, comprising:

a number of memory devices; and a controller coupled to the number of memory devices, wherein the controller includes a cache and is configured to:

receive memory access command; and perform one or more memory operations corresponding to the memory access command to access at least a portion of the cache or one or more of the number of memory devices, or both, according to a selected policy of a plurality of cache writing policies comprising a write-through policy and a write-back policy, wherein the selected policy is selected based on a particular value obtained from a first ratio normalized by a function of a second ratio, wherein:

the first ratio of a quantity of tracked access commands with dirty cache hits to a total quantity of tracked access commands to at least the portion of the cache; and the second ratio of a quantity of tracked read commands to the at least the portion of the cache among a total quantity of tracked read or write commands to the at least the portion of the cache.

12. The apparatus of claim 3, wherein, under the write-back policy, the controller is configured to access the one or more memory devices in response to a dirty cache hit associated with at least a portion of the one or more memory operations performed at at least the portion of the cache for the memory access command.

13. The apparatus of claim 3, wherein, under the write-through policy, the controller is configured to access the one or more memory devices in response to a cache miss associated with at least a portion of the one or more memory operations performed at the cache for the memory access command.

14. The apparatus of claim 11, wherein the cache comprises a plurality of dirty bits each associated with a respective cache line of a plurality of cache lines of the cache.

15. The apparatus of claim 11, wherein the cache comprises a plurality of cache lines each associated with a respective set of dirty bits of the cache.

16. The apparatus of claim 15, wherein the controller is configured to select the policy among the plurality of cache writing policies further based on a quantity of dirty bits of the respective set.

17. The apparatus of claim 16, wherein the controller is configured to select the policy among the plurality of cache writing policies further based on an average of the quantity of the dirty bits of the respective set indicating that a respective portion of the cache is dirty.

18. A method, comprising:

receiving a number of memory access commands;

selecting, for each of the number of memory access commands, a respective policy among a first cache writing policy, comprising a write-through policy, or a second cache writing policy, comprising a write-back policy, wherein the selected policy incurs less latency than other policies of a plurality, wherein the cache writing policy is selected based on a particular value obtained from a first ratio normalized by a function of a second ratio, wherein:

the first ratio of a quantity of tracked access commands with dirty cache hits to a total quantity of tracked access commands to at least a portion of the cache; and the second ratio of a quantity of tracked read commands to the at least the portion of the cache among a total quantity of tracked read or write commands to the at least the portion of the cache; and sequentially performing, according to the selected respective policy, a respective set of memory operations corresponding to each of the number of memory access commands.

19. The method of claim 18, wherein selecting the respective policy among the cache writing policies further comprises comparing a number of accesses that would be incurred for one policy of the plurality to that of the other policies of the plurality as measured at a cache hit rate, the ratio of a quantity of the tracked access commands with dirty cache hits to the total quantity of the tracked access commands to the at least the portion of the cache, and the ratio of a quantity of the tracked read commands to the at least the portion of the cache among the total quantity of the tracked read or write commands to the at least the portion of the cache.

20. The method of claim 18, further comprising updating the first and second ratios as a respective access command of the number of access commands is being executed.

* * * * *